US006965665B2

(12) United States Patent　(10) Patent No.: US 6,965,665 B2
Fan et al.　(45) Date of Patent: Nov. 15, 2005

(54) VOICE INTERACTION TO INSTRUCT A USER TO EFFECT A TRANSACTION WHILE AVOIDING REPEATED TRANSMISSION OF A PREVIOUSLY TRANSMITTED VOICE MESSAGE

(75) Inventors: Rodric C. Fan, Fremont, CA (US); James D. Fay, Palo Alto, CA (US)

(73) Assignee: @ Road, Inc., Fremont, CA (US)

( * ) Notice: Subject to any disclaimer, the term of this patent is extended or adjusted under 35 U.S.C. 154(b) by 36 days.

(21) Appl. No.: 10/778,422

(22) Filed: Feb. 12, 2004

(65) Prior Publication Data

US 2004/0161091 A1　Aug. 19, 2004

Related U.S. Application Data

(62) Division of application No. 09/931,845, filed on Aug. 16, 2001, now abandoned.

(51) Int. Cl.[7] .............................................. H04M 1/64
(52) U.S. Cl. ............................. 379/88.16; 455/404.2; 455/412.1; 379/88.25
(58) Field of Search ........................ 379/88.01, 88.13, 379/88.14, 88.16; 701/1, 200, 201, 205, 207, 701/208, 209, 210, 211, 225; 340/988, 989, 340/990, 995.1, 995.19, 999.24, 996; 705/24; 455/404.1, 404.2, 412.1, 414.1–414.4, 563

(56) References Cited

U.S. PATENT DOCUMENTS

| 5,177,685 | A | 1/1993 | Davis et al. |
| 5,548,822 | A | 8/1996 | Yogo |
| 5,625,668 | A | 4/1997 | Loomis et al. |
| 5,732,074 | A | 3/1998 | Spaur et al. |
| 5,794,164 | A | 8/1998 | Beckert et al. |
| 5,805,672 | A | 9/1998 | Barkat et al. |
| 5,835,907 | A | 11/1998 | Newman |
| 5,913,170 | A | 6/1999 | Wortham |
| 5,918,180 | A | 6/1999 | Dimino |
| 5,938,721 | A | 8/1999 | Dussell et al. |
| 5,959,577 | A | 9/1999 | Fan et al. |
| 5,990,827 | A | 11/1999 | Fan et al. |
| 5,991,739 | A | 11/1999 | Cupps et al. |

(Continued)

FOREIGN PATENT DOCUMENTS

WO　　WO 96/11381　　4/1996

(Continued)

OTHER PUBLICATIONS

Lind, R. et al., "The Network Vehicle—A Glimpse into the Future of Mobile Multi-Media", Proc of the 17th Digital Avionics Systems Conf., Nov. 1998, pp. 121/1-121/8, vol. 2.

(Continued)

Primary Examiner—Roland G. Foster
(74) Attorney, Agent, or Firm—Michael Shenker; MacPherson Kwok Chen & Heid LLP

(57) ABSTRACT

A system and method for voice interaction for location-relevant mobile resource management are disclosed. In one embodiment, a network server transmits a voice message to a voice device at a mobile unit upon detection that the mobile unit is within a predetermined distance of a certain location. Pursuant to another embodiment, the network server receives a voice request for location-relevant information from a user at a mobile unit and transmits responsive location-relevant information to the user as a voice message. The network server may also conduct certain actions responsive to voice requests received from users at mobile units. Users may receive information from the server via voice devices even when not located at a mobile unit.

20 Claims, 5 Drawing Sheets

U.S. PATENT DOCUMENTS

| | | | |
|---|---|---|---|
| 6,006,159 A | 12/1999 | Schmier et al. | |
| 6,021,371 A | 2/2000 | Fultz | |
| 6,026,375 A | 2/2000 | Hall et al. | |
| 6,028,537 A | 2/2000 | Suman et al. | |
| 6,029,072 A | 2/2000 | Barber | |
| 6,091,956 A | 7/2000 | Hollenberg | |
| 6,091,957 A | 7/2000 | Larkins et al. | |
| 6,107,944 A | 8/2000 | Behr et al. | |
| 6,131,067 A | 10/2000 | Girerd et al. | |
| 6,154,658 A | 11/2000 | Caci | |
| 6,167,255 A | 12/2000 | Kennedy et al. | |
| 6,169,955 B1 | 1/2001 | Fultz | |
| 6,182,010 B1 | 1/2001 | Berstis | |
| 6,240,365 B1 | 5/2001 | Bunn | |
| 6,243,039 B1 | 6/2001 | Elliot | |
| 6,246,935 B1 | 6/2001 | Buckley | |
| 6,360,164 B1 | 3/2002 | Murayama | |
| 6,374,176 B1 | 4/2002 | Schmier et al. | |
| 6,385,541 B1 | 5/2002 | Blumberg et al. | |
| 6,389,290 B1 | 5/2002 | Kikinis et al. | |
| 6,401,027 B1 | 6/2002 | Xu et al. | |
| 6,405,123 B1 | 6/2002 | Rennard et al. | |
| 6,408,307 B1 | 6/2002 | Semple et al. | |
| 6,442,394 B1 | 8/2002 | Valentine et al. | |
| 6,456,234 B1 | 9/2002 | Johnson | |
| 6,459,969 B1 | 10/2002 | Bates et al. | |
| 6,496,702 B1 | 12/2002 | Lockhart | |
| 6,505,046 B1 | 1/2003 | Baker | |
| 6,522,971 B1 | 2/2003 | Tanaka | |
| 6,525,768 B2 | 2/2003 | Obradovich | |
| 6,535,743 B1 | 3/2003 | Kennedy et al. | |
| 6,542,076 B1 | 4/2003 | Joao | |
| 6,542,794 B2 | 4/2003 | Obradovich | |
| 6,545,596 B1 | 4/2003 | Moon | |
| 6,549,768 B1 | 4/2003 | Fraccaroli | |
| 6,577,928 B2 | 6/2003 | Obradovich | |
| 6,611,755 B1 | 8/2003 | Coffee et al. | |
| 6,615,186 B1 | 9/2003 | Kolls | |
| 6,625,457 B1 * | 9/2003 | Raith | 455/456.1 |
| 6,636,790 B1 | 10/2003 | Lightner et al. | |
| 6,640,184 B1 | 10/2003 | Rabe | |
| 6,662,016 B1 | 12/2003 | Buckham et al. | |
| 6,677,894 B2 | 1/2004 | Sheynblat et al. | |
| 6,732,031 B1 | 5/2004 | Lowrey et al. | |
| 6,738,630 B2 | 5/2004 | Ashmore | |
| 2001/0029425 A1 | 10/2001 | Myr | |
| 2001/0041562 A1 * | 11/2001 | Elsey et al. | 455/414 |
| 2002/0010000 A1 | 1/2002 | Chern et al. | |
| 2002/0030588 A1 | 3/2002 | Deline et al. | |
| 2002/0049535 A1 * | 4/2002 | Rigo et al. | 701/211 |
| 2002/0055351 A1 | 5/2002 | Elsey et al. | |
| 2002/0061741 A1 | 5/2002 | Leung et al. | |
| 2002/0068585 A1 | 6/2002 | Chan et al. | |
| 2002/0072815 A1 | 6/2002 | McDonough et al. | |
| 2002/0075168 A1 | 6/2002 | Ablay et al. | |
| 2002/0077130 A1 | 6/2002 | Owensby | |
| 2002/0121969 A1 | 9/2002 | Joao | |
| 2002/0127997 A1 * | 9/2002 | Karlstedt et al. | 455/412 |
| 2002/0128000 A1 | 9/2002 | do Nascimento | |
| 2002/0151297 A1 | 10/2002 | Remboski et al. | |
| 2002/0183072 A1 * | 12/2002 | Steinbach et al. | 455/456 |
| 2002/0193124 A1 * | 12/2002 | Hamilton et al. | 455/456 |
| 2003/0035518 A1 | 2/2003 | Fan et al. | |
| 2003/0060214 A1 | 3/2003 | Hendrey et al. | |

FOREIGN PATENT DOCUMENTS

| | | |
|---|---|---|
| WO | WO 97/24005 | 7/1997 |
| WO | WO 97/41654 | 11/1997 |
| WO | WO 98/00988 | 1/1998 |
| WO | WO 98/57189 | 12/1998 |

OTHER PUBLICATIONS

US 6,731,928, 05/2004, Tanaka (withdrawn)

* cited by examiner

VOICE INTERACTION TO INSTRUCT A USER TO EFFECT A TRANSACTION WHILE AVOIDING REPEATED TRANSMISSION OF A PREVIOUSLY TRANSMITTED VOICE MESSAGE

CROSS REFERENCE TO RELATED APPLICATIONS

The present application is a division of U.S. patent application Ser. No. 09/931,845 filed Aug. 16, 2001, now abandoned incorporated herein by reference.

TECHNICAL FIELD

The invention relates to a system and a method for voice interaction for location-relevant mobile resource management.

BACKGROUND

Methods for determining the position of mobile units such as vehicles, airplanes, and ships include time difference of arrival (TDOA), angle of arrival (AOA), ray tracing/pattern recognition, global positioning system (GPS), and hybrid methods using network connections. Among the available methods, GPS includes a plurality of satellites orbiting the earth and sending out positioning information that can be used to calculate vehicle positions. A GPS receiver receives the positioning information from the GPS satellites and uses the positioning information to obtain the position of the receiver. A more detailed discussion of a GPS receiver is found in U.S. Pat. No. 5,990,827 to Rodric C. Fan, et al. entitled "Structure of a Position Processing Apparatus," which is incorporated herein by reference in its entirety.

In using GPS to locate mobile units, such as vehicles, each mobile unit is equipped with a GPS receiver and a wireless transmitter. Using the GPS receiver and the transmitter, the mobile unit determines its position and transmits the position to a ground station. The ground station for a conventional mobile unit locating system normally includes a map database search system and some type of storage medium that stores digital maps and travel-related information. Thus, upon receiving the mobile unit positions from the mobile units, the ground station combines the stored data with the received information and displays the present mobile unit positions on a digital map.

In some cases, a data network, such as the Internet, is involved in locating mobile units. When a data network is involved, a location determination device at or in the mobile unit determines the position of the mobile unit and transmits the position information to a network server. This data transmission from a mobile unit to the network server is accomplished wirelessly by, for example, cellular digital packet data network (CDPD) that connects to a data network (e.g., the Internet), which in turn provides access to the network server.

Pursuant to some embodiments, the mobile units may transmit raw data to the network server so that the network server can make the position determination. In a system that involves a network server, the network server instead of the ground station may access the data storage medium. The data storage medium contains location-relevant information such as maps, locations of other mobile units, locations of service stations, and locations of other destinations of interest. Thus, the data processing unit organizes the measured position and generates an area map. The area map indicates by a position marker the position of each mobile unit.

As mentioned above, location determination devices in mobile units can connect to data networks (e.g., the Internet) wirelessly through communication networks, for example a CDPD network. Additional details regarding CDPD systems are further described in K. Budka et al., "Cellular Digital Packet Data Networks," Bell Labs Technical Journal, Vol. 2, No. 3 (Summer 1997); "Cellular Digital Packet Data Systems Specification: Releases 1.1," CDPD Forum, Inc., Chicago (1995); and M. S. Taylor et al., "Internet Mobility: The CDPD Approach," Prentice Hall PTR, Upper Saddle River, N.J. (1996).

In the past, however, the driver, or other occupant of a vehicle, has typically used a visual display device disposed within the vehicle to visually and manually access and interface with location-relevant information available from the data network. These conventional visual display devices provide limited visual display capability, which limits the quantity of location-relevant information and the speed at which the vehicle occupant may receive such information. Users usually enter information into the visual display device manually and receive information from the device visually, such as by reading. In some situations, or applications, such as when the user is driving, this method of interaction may be cumbersome, inefficient, or both. Due to the difficulty for the user in interfacing with information available from the data network, in the past, interaction between the user and such information has been limited.

Additionally, these conventional visual display devices are typically mounted on the vehicle. Thus, users may only access and interface with location-relevant information on the network at the vehicle and can not access or interface with the information when away from the visual display device.

A need exists, therefore, for an improved system and method for providing location-relevant information to mobile units, such as vehicles, which can provide the location-relevant information in an improved manner to overcome or alleviate limitations of conventional systems and methods.

SUMMARY

A system and method are provided for delivering location-relevant information to a user by receiving user location information at a network server and then using the user location information to create a user message at the network server. The network server may transmit the user message to the user as a voice message to permit the user to access location-relevant information in an audible manner.

Another embodiment provides a system and method for delivering location-relevant information by receiving user location information at a network server and receiving a voice query from the user at the network server. A voice processor at the network server converts the voice query to a corresponding data message. The network server uses the user location information to create a response to the data message and transmits the response as a voice message.

Accordingly, the present system and method permit a user to receive location-relevant information audibly over a voice-enabled device and to make queries for location-relevant information via a voice-enabled device. The voice-enabled device may comprise, for example, a cellular telephone or a voice-enabled personal digital assistant (PDA). Receiving such location-relevant information in this manner may be more efficient and less cumbersome, in some applications, than using a visual or manual interface device.

BRIEF DESCRIPTION OF THE DRAWINGS

In the various drawings of the various embodiments, similar features of the various embodiments typically have the same reference numbers.

DETAILED DESCRIPTION

Figure 1:
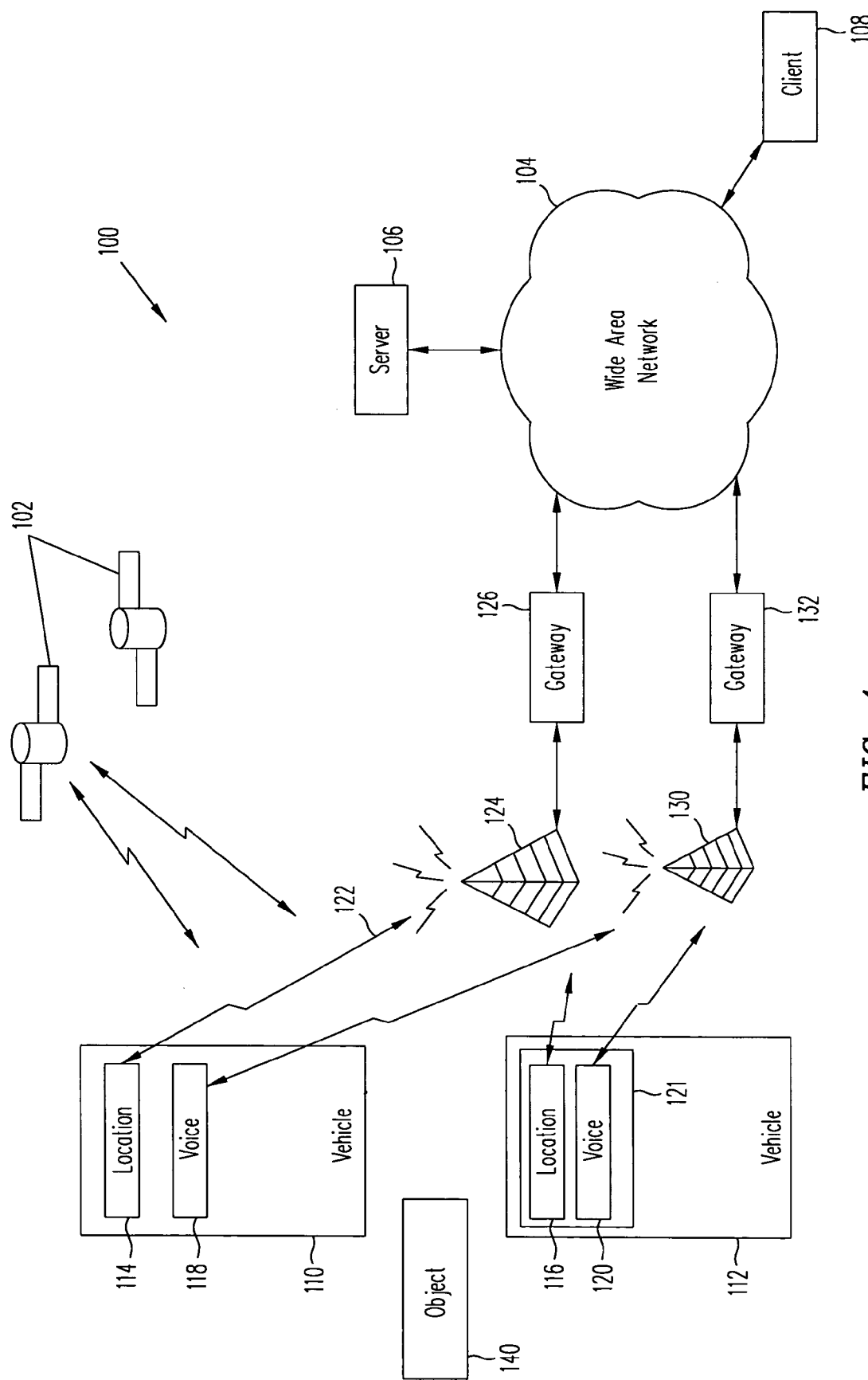
FIG. 1 illustrates a system for providing voice interaction for location-relevant mobile resource management according to one embodiment of the present invention.

FIG. 1 provides an overview of one embodiment of a location-based information system 100 in accordance with the present invention. The embodiment of FIG. 1 includes GPS satellites 102, a wide area network 104, a server computer 106, a client computer 108, and mobile units, such as vehicles, 110 and 112. The mobile units 110 and 112 have location devices 114 and 116 respectively disposed therein. Additionally, the mobile units 110 and 112 also have voice devices 118 and 120 respectively disposed therein. The voice devices 118 and 120 may comprise hands-free cellular device systems, which may be operated by voice commands in a hands-free manner.

The mobile unit 112 illustrates the location device 116 and the voice device 120 being disposed in a common housing 121. In one embodiment, the common housing 121 is that of a cellular telephone device. Because the device enclosed by the housing 121 is not necessarily mounted on the vehicle 112, the device may be used outside of and away from the vehicle 112 in an independent manner.

The location devices 114 and 116 may comprise any of a variety of conventional location determination devices. For example, the devices 114 and 116 may use location determination techniques including global positioning system (GPS), time difference of arrival (TOA), angle of arrival (AOA), ray tracing/pattern recognition, hybrid methods of the foregoing, and the like to determine the location of the device. Each of the location devices 114 and 116 includes a wireless transmitter, such as a CDPD modem, to periodically and wirelessly transmits user location data 122 to the server 106 via a base station 124, a gateway 126, and the wide area network 104. In one embodiment, the wide area network comprises the Internet. Additional details regarding one embodiment of a location device 114, 116 are disclosed in U.S. Pat. No. 5,990,827, which is hereby incorporated herein by reference in its entirety.

Each of the voice devices 118 and 120 may comprise a cellular telephone, a voice-enabled PDA, or the like and may be used by a user to wirelessly communicate by voice with the server 106. In particular, the voice devices 118 and 120 communicate wirelessly with the server 106 via a base station 130, a gateway 132, and the wide area network (WAN) 104. Other voice devices (not shown) may also communicate with the server 106 even when not located at a mobile device. Alternatively, the server 106 could be directly coupled to the base station 130 to eliminate use of the gateway 132 and WAN 104.

The location devices 114 and 116 and the voice devices 118 and 120 respectively communicate with corresponding base stations, such as the base stations 124, 130 using conventional protocols and techniques, including CDPD, GSM, iDEN, AMPS, CDMA, or the like.

In this configuration, the location devices 114 and 116 periodically and continuously transmit user location information to the server 106. Alternatively, or additionally, the location devices 114 and 116 may transmit the user location information to the server 106 on demand by the user, upon request by the server 106, or both. The user location information comprises information indicating the location of the transmitting location device 114, 116.

Pursuant to one embodiment, and as discussed in more detail below, by using one of the voice devices 118, 120, or another voice device, a user may obtain a variety of location-relevant information from the server 106. As discussed in more detail below, the server 106 includes a voice processor of conventional design that receives a voice query from a voice device and converts the received voice query into a corresponding data message. The server 106 then determines a response to the voice query and transmits a responsive voice message to the user via the voice processor. Thus, this embodiment permits the user to obtain location-relevant information from the server 106 in an audible manner by sending and receiving voice messages wirelessly using a voice device. Alternatively, the user may transmit a query using a keypad device, the voice devices 118, 120 comprise keypad devices in that they include keypads to enable telephone number dialing. Also, the server 106 may respond to the user query by transmitting a non-voice message to a display device at the associated mobile unit 110, 112.

The responsive voice message may comprise, for example, driving directions from the current location of the user to a particular location, such as to the object 140. Additional details regarding this embodiment and the server 106 are described below.

In another embodiment, the server 106 monitors the location of each mobile unit, by periodically and continually receiving user location information from a location device disposed within the associated mobile unit. Using the received user location information from the location device 114, the server 106 generates a telephone call to the associated voice device 118 when the user location information indicates that the mobile unit, such as the vehicle 110, is, for example, within a predetermined distance to an object 140. The server 106 may deliver a voice message to the user within the vehicle 110 regarding the object 140. The object 140 may comprise, for example, a geographical location, a business, another mobile unit, or the like. Additional details regarding this embodiment are described below.

According to yet another embodiment, a user may transmit a voice message to the server 106 requesting that the server 106 execute a particular action. For example, a user may send a voice message from the voice device 118 to the server 106 requesting that the server 106 execute a business transaction or send a voice message to all mobile devices currently located in a particular geographical area. In one embodiment, the voice message comprises driver instructions. Additional details regarding this embodiment are described below.

As discussed in more detail below, the server 106 also maintains a log of the various mobile unit locations as well as all of the received and transmitted voice messages.

In addition, the client computer 108 may also access information stored on the server 106 and may supply information to the server 106 over the network 104.

Additional details regarding features of the system 100 and the location devices 114 and 116 are described in U.S. patent application Ser. No. 09/697,690, entitled "System and Method for Providing Mobile Location-Relevant Commerce" filed Oct. 25, 2000, and U.S. patent application Ser. No. 09/599,053 entitled "Dual Platform Location-Relevant Service" filed Jun. 21, 2000, both of which are hereby incorporated herein by reference in their respective entireties.

Figure 2:
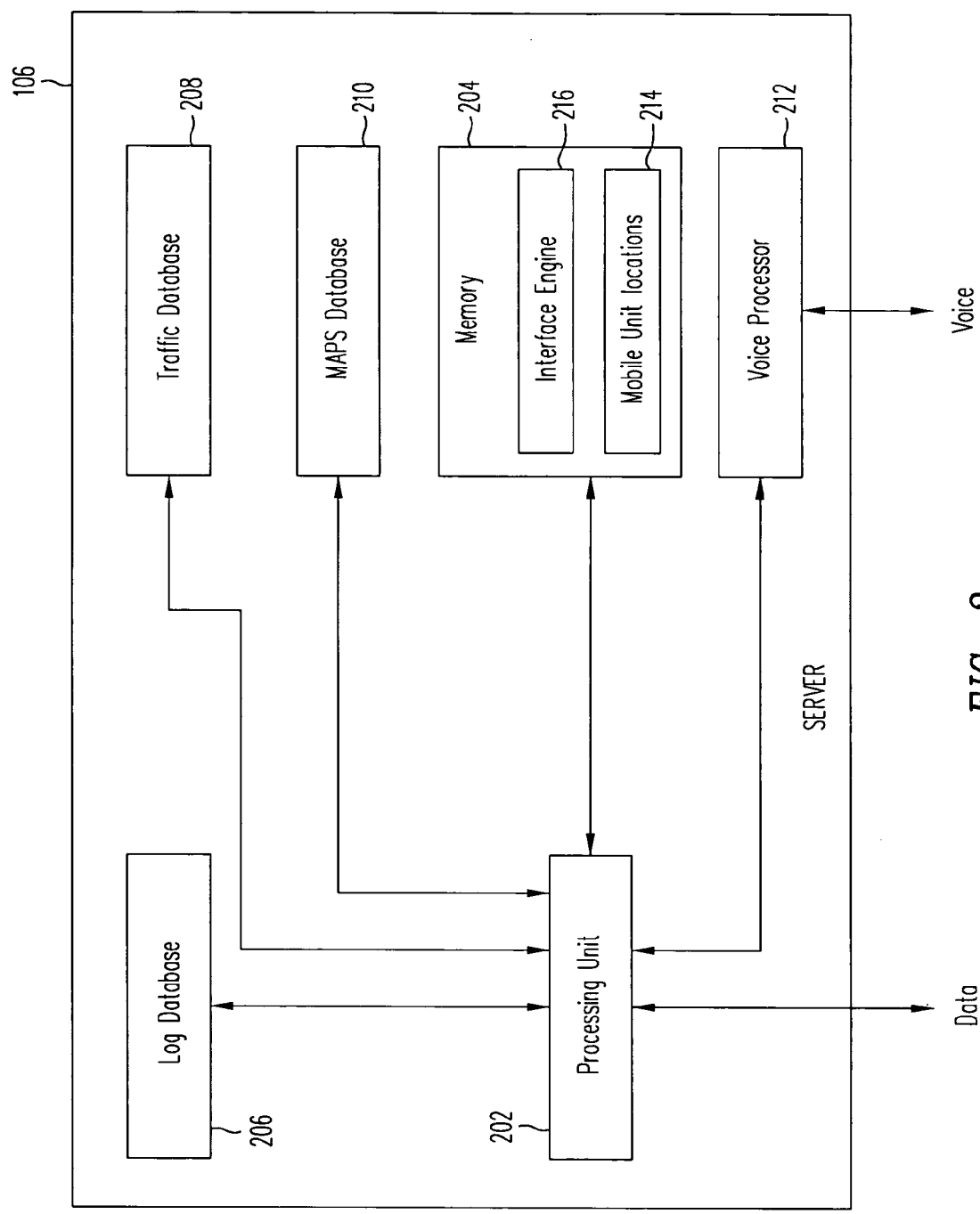
FIG. 2 illustrates details of the server of FIG. 1 according to one embodiment of the present invention.

FIG. 2 illustrates details of the server 106. As shown, the server 106 includes a processing unit 202, a memory 204, a log database 206, a traffic database 208, a maps database 210, and a voice processor 212. The processing unit 202 may comprise a general-purpose computer, such as a mainframe computer, or a computer system including a database server and a web page server.

The voice processor 212 receives voice messages from voice devices, such as the voice devices 118 and 120 (FIG. 1) and converts the received voice messages to corresponding data messages and passes the corresponding data messages to the processing unit 202 for processing. The voice processor 212 also receives outgoing data messages from the processing unit 202 and converts the outgoing data messages into corresponding voice messages and transmits the corresponding voice messages to one or more voice devices, such as the voice devices 118 and 120.

The voice processor 212 is of conventional design and may comprise components such as, for example, a Global SCSA 4-Port Voice Processing Board and SingleSpan Series ISDN PRI Boards available from Intel Corporation, Santa Clara, Calif. Other voice processing equipment may also be employed. Additional details regarding voice processing equipment and methods are disclosed in U.S. Pat. No. 5,991,739, to Cupps et al., and entitled "Internet Online Order Method and Apparatus" which is hereby incorporated by reference in its entirety.

In another embodiment, the functions of the voice processor 212 are performed at the various voice devices 118 and 120. Pursuant to this embodiment, each voice device converts received voice messages into corresponding data messages readable by the processing unit 202 and converts received data messages into corresponding voice messages.

The processing unit 202 also receives location and non-location information from the location devices 114 and 116 as data over the network 104 (FIG. 1). In one embodiment, the processing unit 202 uses the received location information to compute the location and velocity of each mobile unit. The respective location and, optionally, velocity, of each of the mobile units are stored in the mobile unit locations 214 portion of the memory 204. Alternatively, the mobile unit locations 214 portion of the memory 204 may comprise a database. Details regarding a method of determining location data using GPS code sequences are described in U.S. Pat. No. 5,959,577 to R. Fan, et al., and entitled "Method and Structure for Distribution of Travel Information Using Network," which is hereby expressly incorporated herein by reference in its entirety.

Interface engine 216 is stored in memory 204 and manages the interaction between one or more users and the server 106. In one embodiment, when a user sends a voice message to the server 106, the voice message is received at the voice processor 212 and converted to a corresponding data message, which is then received by the interface engine 216 via the processing unit 202. The interface engine 216 then calculates, or determines a response to the message using the mobile unit locations 214 and the data stored in the various databases 206, 208, and 210. If the determined response is a voice message, then the interface engine 216 generates a data message corresponding with the responsive voice message and passes the data message to the voice processor 212 via the processing unit 202 for transmission to the user.

The log database 206 includes a record of the locations and velocities of the various mobile units, such as the vehicles 110 and 112 (FIG. 1). In addition, the log database includes a record of the interactions, including voice interactions, between users and the server 106. Thus, when a user makes a voice request or query to the server 106 via the voice processor 212, the interface engine 216 records data representative of the voice request or query in the log database 206. The log database 206 is useful in tracking the history of movements of the various mobile units as well as tracking the messages sent between the server 106 and the users.

The traffic database 208 contains traffic information. The traffic information may include, for example, historical traffic data for a predetermined time frame (e.g., three days) and traffic pattern data under typical conditions. This historical traffic data permits the interface engine 216 to provide users with specific traffic information regarding specific streets at certain times of the day. Moreover, the traffic information may also include marketplace traffic data obtained from real time traffic reports, such as those available on traffic and news websites. The marketplace traffic data may be supplemented with traffic data received by the various mobile units reporting user location information to the server 106. Additional details regarding the traffic database 208 are described in U.S. patent application Ser. No. 09/898,682, entitled "Using Location Data to Determine Traffic Information," by Rodric C. Fan, Xinnong Yang, James D. Fay, filed Jul. 3, 2001.

The maps database 210 includes maps, road segments, and road data for use by the interface engine 216 in providing information to user via voice messages. The road segments comprise information regarding a strip or portion of a street having a same continuous speed limit and may be useful in determining an estimated travel time between two locations. The road data may include data such as speed limits, locations of traffic lights, stop signs, one-way streets, and toll road information. Moreover, the maps database 210 includes location information for many businesses, such as gas stations and restaurants, as well as other geographical locations.

The current locations of the various mobile units, such as the vehicles 110 and 112 (FIG. 1), are stored in memory 204 at mobile unit locations 214. The mobile unit locations 214 are periodically and continually updated by the receipt of new user location information from location devices 114 and 116 at the various mobile units. Each mobile unit includes a location device, such as the location devices 114 and 116.

Additional details regarding the operation of the interface engine 216, the server 106, and the system 100 (FIG. 1) are described below with reference to FIGS. 3–6.

Figure 3:
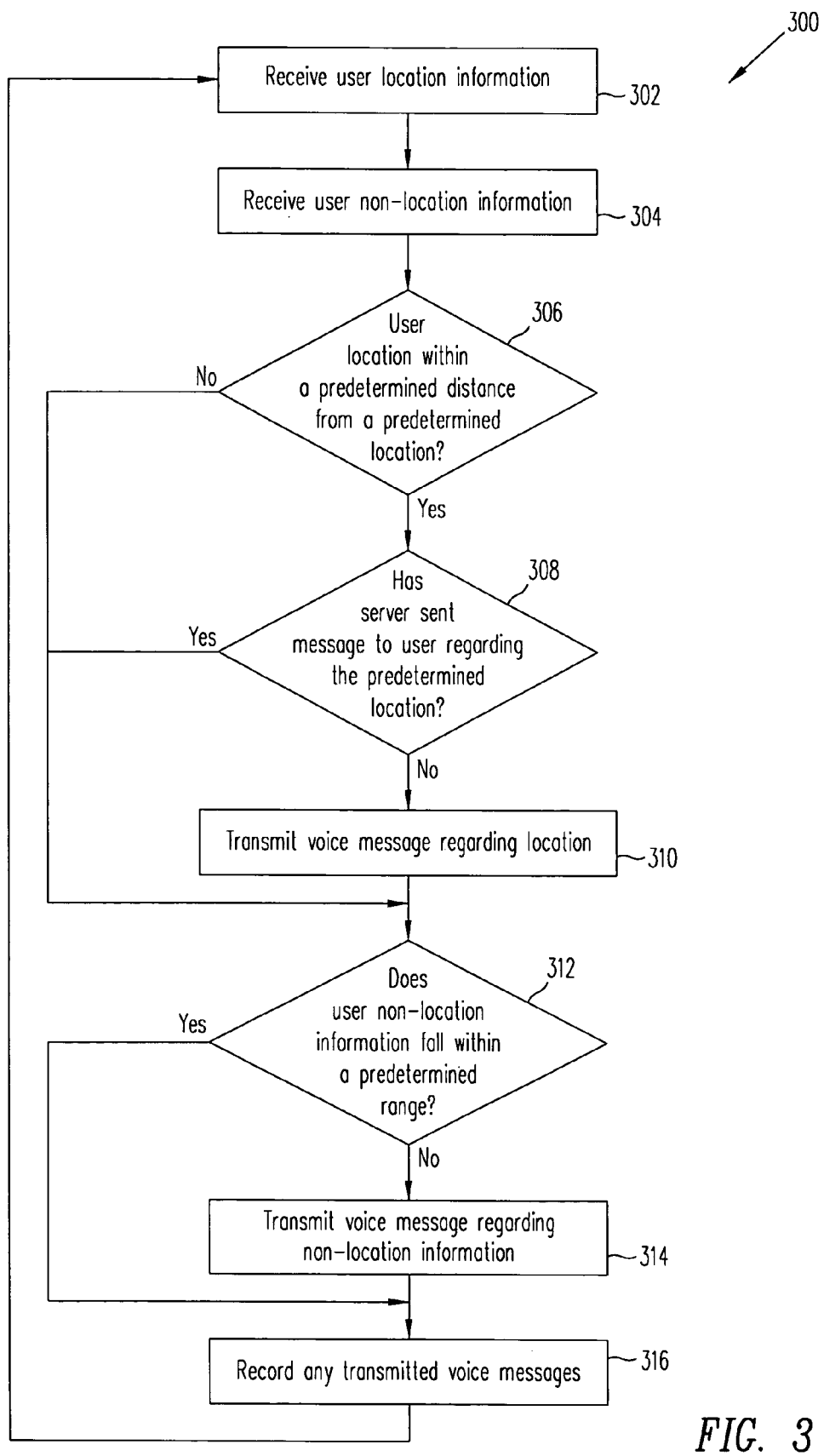
FIG. 3 is a flowchart illustrating a method according to one embodiment of the present invention.

FIG. 3 is a flowchart illustrating a method 300 according to one embodiment of the present invention. As shown, the method 300 commences at block 302 with the server 106 receiving user location information. In particular, the location devices 114 and 116 (FIG. 1) periodically and continually transmit user location information in a wireless manner to the server 106 via the base station 124, the gateway 126, and the network 104. The server 106 receives these periodic transmissions of user location information and stores such information in the mobile unit locations 214 and in the log database 206.

The server 106 may also receive non-location information from a location device 114, pursuant to block 304. The non-location information may include vehicle status information such as engine temperature, fuel tank level, oil pressure, vehicle speed, tire pressure, and the like, where the location device 114 is coupled to a vehicle data bus of the associated vehicle 110. The non-location information may also contain other, non-vehicle-related information, such as, for example, the time of day or some other information. This non-location information may be wirelessly transmitted by the location device 114 using the wireless modem disposed therein. Thus, similar to the user location information, the location device 114 may periodically and continually transmit non-location information to the server 106 in a wireless manner to the server 106 via the base station 124, the gateway 126, and the network 104. The non-location information may also be stored by the server 106 in the log database 206 and in the mobile unit locations 214 of the memory 204.

Next, pursuant to block 306, the interface engine 216 determines for a particular user whether the user location is within a predetermined distance from a predetermined location using the maps database 210 and the mobile unit locations 214. For example, the interface engine 216 may determine the driving distance between the object 140 (FIG. 1) and the vehicle 110 using the maps database 210 and the mobile unit locations 214. If the interface engine 216 determines that the driving distance between the location of the vehicle 110 and the object 140 is within (e.g., less than or equal) a predetermined distance (e.g., two miles) then execution proceeds to block 308, else execution proceeds to block 312 as illustrated in FIG. 3.

At block 308, the interface engine 216 determines whether the server 106 has sent a message to the user at the vehicle 110 regarding the predetermined location, such as the object 140 (FIG. 1) within a predetermined time. If the server 106 has not sent a message to the user at the vehicle 110 within a predetermined time (e.g., one hour), execution proceeds to block 310, else execution proceeds to block 312.

At block 310, the server 106 transmits a voice message regarding the predetermined location 140 to the user at the vehicle 110 via the voice device 118. In particular, the interface engine 216 generates a data message corresponding to a voice message regarding the predetermined location 140 to be sent to the user at the vehicle 110 via the voice device 118. The interface engine 216 passes the data message to the processing unit 202, which causes the data message to be transmitted to the voice device 118 via the voice processor 212. Thus, the user at the vehicle 110 will receive a telephone call on voice device 118 with a voice message regarding the predetermined location 140. For example, the voice message might state "You are presently within two kilometers from the ABC Company. Would you like driving directions to this location?"

The specific content of the voice message may, however, vary. In one embodiment, the voice message may include a notification regarding the proximity of the vehicle 110 to the predetermined location 140. In another embodiment, the voice message may include instructions for the user to take some action regarding the predetermined location, such as to effect a particular transaction at the predetermined location 140. The voice message may also include driving directions for the user to drive from the current location of the user to the predetermined location. Thus, the user, such as the driver or other occupant of the vehicle 110, may receive a telephone call on a voice device 118 and listen to a voice message regarding the predetermined location. The user may also send voice messages to the server 106 and receive further information from the server 106 as described below with reference to FIG. 4.

At block 312, the interface engine 216 determines whether the user non-location information falls within a predetermined range of acceptable values. As mentioned above, the user non-location information may comprise information regarding the status of the vehicle 110, such as the engine temperature, fuel level, oil pressure, tire pressure, vehicle speed, or the like. If one or more of these parameters is outside the range of predetermined values for the parameter, execution proceeds to block 314, else execution proceeds to block 316.

At block 314, the server 106 transmits a voice message to the user at the vehicle 110 regarding the non-location information. For example, if the non-location information was the amount of fuel in the vehicle 110 and that amount was less than a predetermined amount, then the server 106 would transmit a voice message to the user at the vehicle 110 via the voice device 118 regarding the amount of fuel remaining in the vehicle 110. In particular, the voice message might contain information regarding the distance the vehicle will be able to travel without refueling and the identification of gas stations within a predetermined distance from the current location of the vehicle 110. Thus, the user, such as the driver or other occupant of the vehicle 110 may receive a telephone call on a voice device 118 and listen to a voice message regarding the non-location information. The user may also send voice messages to the server 106 and receive further information from the server 106 as described below with reference to FIG. 4.

At block 316, the server 106 records the content and time of any voice messages transmitted or received at the server 106 in the log database 206. The server 106 also records the user location information in the log database 206. The server 106 may alternatively record the content and time of the voice messages transmitted or received at the server 106 at the time of their transmission or reception, respectively.

Execution then returns to block 302. In this manner, the server 106 monitors the location of the various mobile units relative to certain predetermined locations and sends a voice message to a mobile unit when the server 106 determines that the mobile unit is within a predetermined distance from one or more of the predetermined locations. In addition, the server 106 monitors user non-location information and transmits a voice message to the user when the non-location information is outside a predetermined range.

Figure 4:
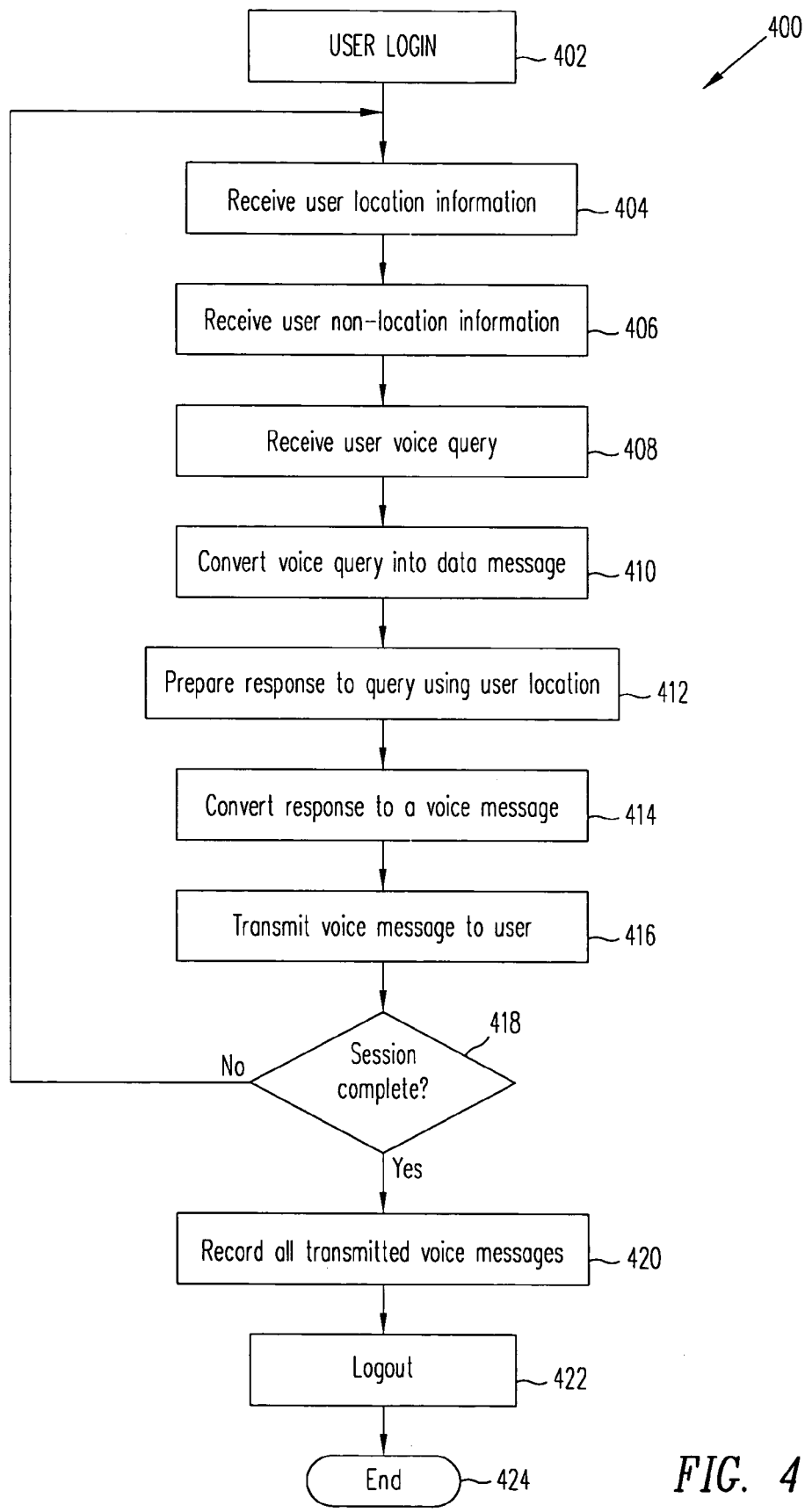
FIG. 4 is a flowchart illustrating a method according to one embodiment of the present invention.

FIG. 4 is a flowchart illustrating a method 400 according to one embodiment of the present invention. As shown, the method 400 commences at block 402 with the user placing a telephone call from a voice device, such as the voice device 118 (FIG. 1) to the server 106 and performing a login operation. In one embodiment, the user speaks a voice login access code. In another embodiment, the user enters a login access code using dialing buttons or another input mechanism on the voice device.

Next, the server 106 receives user location information pursuant to block 404. As discussed above, the location devices 114 and 116 (FIG. 1) periodically and continually transmit user location information in a wireless manner to the server 106 via the base station 124, the gateway 126, and the network 104. The server 106 receives these periodic transmissions of user location information and stores such information in the mobile unit locations 214 and in the log database 206.

The server 106 may also receive non-location information from a location device 114 where the location device 114 is coupled to a vehicle data bus (not shown) of the associated vehicle 110, pursuant to block 406.

At block 408, the server 106 receives a voice message such as a query or request from the user at the mobile unit 110 via the voice device 118. In particular, with a telephone call between the server 106 and the voice device 118 initiated and in progress, the user speaks a voice message into the voice device 118, which then wirelessly transmits the voice message to the server 106 via the base station 130, the gateway 132, the wide area network 104. The server 106 receives the voice message via the voice processor 212.

Next, pursuant to block 410, the voice processor converts the received voice message to a corresponding data message and sends the data message to the processing unit 202.

At block 412, the interface engine 216 receives the data message corresponding to the voice message from the user and determines a response to the message using the user location information, the user non-location information, or both. In addition, the interface engine 216 may access information stored in one or more of the databases 206, 208, and 210 in determining the response. The voice processor 212 then converts the response to a voice message at block 414 and transmits the voice message to the user at the voice device 118, pursuant to block 416.

As mentioned above, the user's voice message may comprise a query or request for information and, as such, the content of the voice message may vary. In one embodiment, the voice message may include a request for traffic information. In response, the interface engine 216 accesses the traffic database 208 as well as the user location information to generate a response to the user's voice message. The response may include traffic information relevant to the current location of the user as indicated by the user location information.

In another embodiment, the user's voice message may comprise a request for driving or routing directions from the user's current location to a particular destination. In response, the interface engine 216 accesses the maps database as well as the user location information to generate a response to the user's voice message. The response thus may include point-to-point directions to a particular location identified in the user's voice message from the current location of the user as indicated by the user location information.

Pursuant to another embodiment, the user's voice message may comprise a request for location information of the user. In response, the interface engine 216 accesses the maps database as well as the user location information to determine the location of the user. The server 106 may then communicate, via a voice message, to the user the location of the user, such as by identifying the street on which the user is traveling, the direction of travel, the nearest cross-streets, or the like.

In another embodiment, the user's voice message may comprise a request for location information of one or more other mobile units. The user's voice message may specifically request the location of a particular mobile unit or the user's voice message may request the location, identity, or both for all mobile units within a particular geographical region. The particular geographical region may comprise an area defined by a specific radius or distance from a certain location. In response, the interface engine 216 may access the maps database 210 as well as the mobile unit locations 214 to generate a response. The server 106 may then communicate to the user the location of a specific other mobile unit or the location and identity of all mobile units located within a particular geographical region.

Pursuant to yet another embodiment, the user's voice message may comprise a request for information at least partially based on non-location information. For example, the user's voice message may comprise a request for the distance the vehicle 110 is able to travel without refueling. In response, the interface engine 216 calculates this distance using the user non-location information, which may include the type of vehicle and the amount of fuel in the fuel tank of the vehicle. Based on these parameters and stored information relating to the fuel efficiency or miles/gallon of the particular vehicle type, the interface engine 216 calculates the distance the vehicle may travel without refueling. The server 106 then communicates this distance to the user as a voice message via the voice processor 212.

In another embodiment, the user's voice message may comprise a request that the server 106 save, or store in memory, a request for point-to-point directions. The server 106, in turn, monitors the user's progress along the path defined by the point-to-point directions and transmits a voice message to the user if the user ventures more than a predetermined distance from the path. For example, such a message may notify the user that the user is more than a predetermined distance from the path and may ask user if the user would like updated directions based on the user's current location, or both.

At block 418, the interface engine 216 determines whether the user session is complete, such as by detecting that the voice device 118 has gone on-hook or has been hung-up, thus terminating the telephone call or by receiving a termination message from the user via the voice device 118. If the interface engine 216 determines that the session is complete, execution proceeds to block 420, else execution returns to block 404.

At block 420, the server 106 records information regarding all transmitted and received voice messages during the session and also records user location information and user non-location information in the log database 206. At block 422, the interface engine 216 performs a logout operation, which terminates the user session with the server 106. The method 400 ends at block 424.

Figure 5:
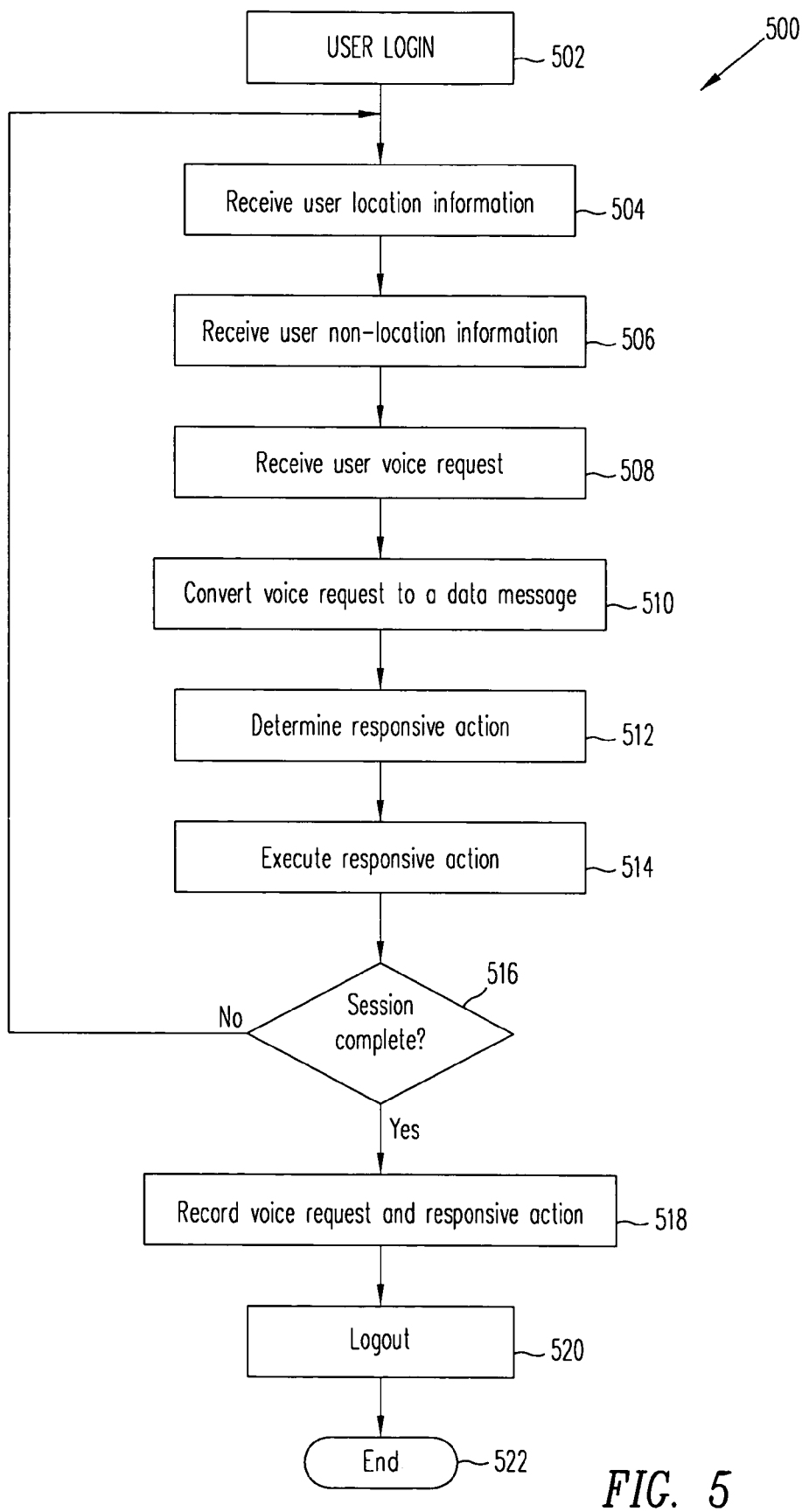
FIG. 5 is a flowchart illustrating a method according to one embodiment of the present invention.

FIG. 5 is a flowchart illustrating a method 500 according to one embodiment of the present invention. As shown, the method 500 commences at block 502 with the user placing a telephone call from a voice device, such as the voice device 118 (FIG. 1) to the server 106 and performing a login operation. In one embodiment, the user speaks a voice login access code. In another embodiment, the user enters a login access code using dialing buttons on the voice device.

Next, the server 106 receives user location information pursuant to block 504. As discussed above, the location devices 114 and 116 (FIG. 1) periodically and continually transmit user location information in a wireless manner to the server 106 via the base station 124, the gateway 126, and the network 104. The server 106 receives these periodic transmissions of user location information and stores such information in the mobile unit locations 214 and in the log database 206.

The server 106 may also receive non-location information from a location device 114where the location device 114 is coupled to, for example, a vehicle data bus (not shown) of the associated vehicle 110, a PDA handheld supply chain management device, or some other mobile device pursuant to block 506.

At block 508, the server 106 receives a voice message such as request from the user at the mobile unit 110 via the voice device 118. In particular, with a telephone call between the server 106 and the voice device 118 initiated and in progress, the user speaks a voice message into the voice device 118, which then wirelessly transmits the voice message to the server 106 via the base station 130, the gateway 132, the wide area network 104. The server 106 receives the voice message via the voice processor 212.

Next, pursuant to block 510, the voice processor converts the received voice message to a corresponding data message and sends the data message to the processing unit 202.

At block 512, the interface engine 216 receives the data message corresponding to the voice message from the user and determines an action responsive to the message using the user location information, the user non-location information, or both. In addition, the interface engine 216 may access information stored in one or more of the databases 206, 208, and 210 in determining the responsive action. The interface engine 216 then executes the determined responsive action pursuant to block 512.

In this embodiment, the user's voice message may comprise a request for a particular action and, as such, the content of the voice message may vary. In one embodiment, the voice message may include a request for a broadcast voice message to be delivered to a set of mobile units. For example, the user's voice message may specify that all mobile units within a predetermined distance of a certain location will receive a particular broadcast message. In response, the interface engine 216 accesses mobile unit locations 214 and the maps database 210 to identify the mobile units within the specified area. The interface engine 216 then executes the responsive action by sending a voice message to each of the identified mobile units.

In another embodiment, the user's voice message may comprise a request for the execution of a business transaction. For example, the voice request may comprise a request for a tow truck, where the server 106 requests or schedules a tow truck, such as from a third party to arrive at the user's current location as stored in the mobile unit locations 214. The scheduling of the tow truck may be via the voice processor or as a data transmission.

At block 516, the interface engine 216 determines whether the user session is complete, such as by detecting that the voice device 118 has gone on-hook or has been hung-up, thus terminating the telephone call or by receiving a termination message from the user via the voice device 118. If the interface engine 216 determines that the session is complete, execution proceeds to block 518, else execution returns to block 504.

At block 518, the server 106 records information regarding all transmitted and received voice messages and responsive actions during the session and also records user location information and user non-location information in the log database 206. At block 520, the interface engine 216 performs a logout operation, which terminates the user session with the server 106. The method 500 ends at block 522.

The above detailed description and accompanying drawings are provided to illustrate the specific embodiments of the present invention and are not intended to be limiting. Numerous modifications and variations within the scope of the present invention are possible. The present invention is particularly pointed out and distinctly claimed in the following claims.

What is claimed is:

1. A method for instructing a user to effect a transaction, the method comprising:
   (1) receiving user location information at a computer system via a network transmission from a location device;
   (2) the computer system determining if the location device is within a predetermined traveling distance from a predetermined location;
   (3) upon determining that one or more conditions are satisfied including a condition that the location device is within said predetermined traveling distance from said predetermined location, the computer system performing a network transmission of a voice message to the user, the voice message comprising instructions to the user to effect a transaction at the predetermined location;
   wherein determining that one or more conditions are satisfied comprises determining if a first message regarding the predetermined location has been previously transmitted to the user within a predetermined time, wherein the computer system does not transmit the voice message if the first message has been previously transmitted to the user within the predetermined time.

2. The method of claim 1 wherein the traveling distance is a driving distance determined using a maps database.

3. The method of claim 1 wherein the predetermined time is one hour.

4. An apparatus for instructing a user to effect a transaction, the apparatus comprising a computer system for:
   receiving user location information via a network transmission from a location device;
   determining if the location device is within a predetermined traveling distance from a predetermined location;
   upon determining that one or more conditions are satisfied including a condition that the location device is within said predetermined traveling distance from said predetermined location, performing a network transmission of a voice message to the user, the voice message comprising instructions to the user to effect a transaction at the predetermined location;
   wherein determining that one or more conditions are satisfied comprises determining if a first message regarding the predetermined location has been previously transmitted to the user within a predetermined time, wherein the computer system does not transmit the voice message if the first message has been previously transmitted to the user within the predetermined time.

5. The apparatus of claim 4 wherein the traveling distance is a driving distance determined using a maps database.

6. The apparatus of claim 4 wherein the predetermined time is one hour.

7. The method of claim 1 wherein the first message is a voice message.

8. The method of claim 1 wherein the operation of receiving user location information comprises repeatedly receiving transmissions of the user location information from the location device, the transmissions including periodic and continuous transmissions each of which is not a transmission performed on demand by the user.

9. The method of claim 8 wherein the operations (2) and (3) are performed repeatedly in response to the periodic and continuous transmissions.

10. The method of claim 9 wherein the first message is a voice message transmitted in an earlier execution of the operation (3).

11. The method of claim 1 wherein the operation of receiving user location information comprises receiving one or more transmissions of the user location information from the location device, the one or more transmissions being provided upon occurrence of one or more predetermined conditions.

12. The method of claim 11 wherein the one or more conditions comprise a demand by the user.

13. The method of claim 11 wherein the one or more conditions comprise a request by the computer system.

14. The apparatus of claim 4 wherein the first message is a voice message.

15. The apparatus of claim 4 wherein the operation of receiving user location information comprises repeatedly receiving transmissions of the user location information from the location device, the transmissions including periodic and continuous transmissions each of which is not a transmission performed on demand by the user.

16. The apparatus of claim 15 wherein the operations (2) and (3) are performed repeatedly in response to the periodic and continuous transmissions.

17. The apparatus of claim 16 wherein the first message is a voice message transmitted in an earlier execution of the operation (3).

18. The apparatus of claim 4 wherein the operation of receiving user location information comprises receiving one or more transmissions of the user location information from the location device, the one or more transmissions being provided upon occurrence of one or more predetermined conditions.

19. The apparatus of claim 18 wherein the one or more conditions comprise a demand by the user.

20. The apparatus of claim 18 wherein the one or more conditions comprise a request by the computer system.

* * * * *